United States Patent [19]

Miyoshi et al.

[11] Patent Number: 5,146,099
[45] Date of Patent: Sep. 8, 1992

[54] APPARATUS FOR MEASURING AMOUNT OF POSITIONAL DEVIATION OF A RECORDING SHEET

[75] Inventors: Atsuko Miyoshi, Hiroshima; Hiroshi Miwa, Hyogo, both of Japan

[73] Assignee: Mitsubishi Denki Kabushiki Kaisha, Japan

[21] Appl. No.: 720,690

[22] Filed: Jun. 25, 1991

[30] Foreign Application Priority Data

Jun. 27, 1990 [JP] Japan .................... 2-171919

[51] Int. Cl.$^5$ .......................................... G01N 21/86
[52] U.S. Cl. ............................... 250/548; 356/400
[58] Field of Search ............ 250/548, 557, 561, 571, 250/226; 356/399, 400, 401, 418; 364/526, 559; 101/211; 382/22, 17

[56] References Cited

U.S. PATENT DOCUMENTS

4,596,468 6/1986 Simeth ..................... 356/400
4,856,903 8/1989 Kipphan et al. .............. 356/400
4,872,024 10/1989 Nagai et al. .
5,063,528 11/1991 Miwa et al. .

FOREIGN PATENT DOCUMENTS

218259 4/1987 European Pat. Off. .
59-96398 5/1984 Japan .
60-242343 12/1985 Japan .

Primary Examiner—David C. Nelms
Assistant Examiner—K. Shami
Attorney, Agent, or Firm—Leydig, Voit & Mayer

[57] ABSTRACT

Apparatus for measuring amount of positional deviation of a recording sheet, in which the equation for obtaining the sum of square of the differences between the border coordinate data of the patterns obtained from the video image and the approximate straight line approximating the borders of the patterns is solved with respect to the constants of the approximate straight line, so that a straight line is obtained which represents the borders best, and the positions of the patterns are each determined with at least two approximate straight lines. And a cubic curve is set up which passes through the positions of at least two patterns, and the equation representing the sum of squares of the differences between the cubic curve and the positions of the two patterns with the edge of the recording sheet as a reference position is solved with respect to the variables of the approximate straight line, to obtain a cubic curve equation. The cubic curve equation is utilized to detect the amount of positional deviation of the recording sheet in the direction of conveyance.

8 Claims, 13 Drawing Sheets

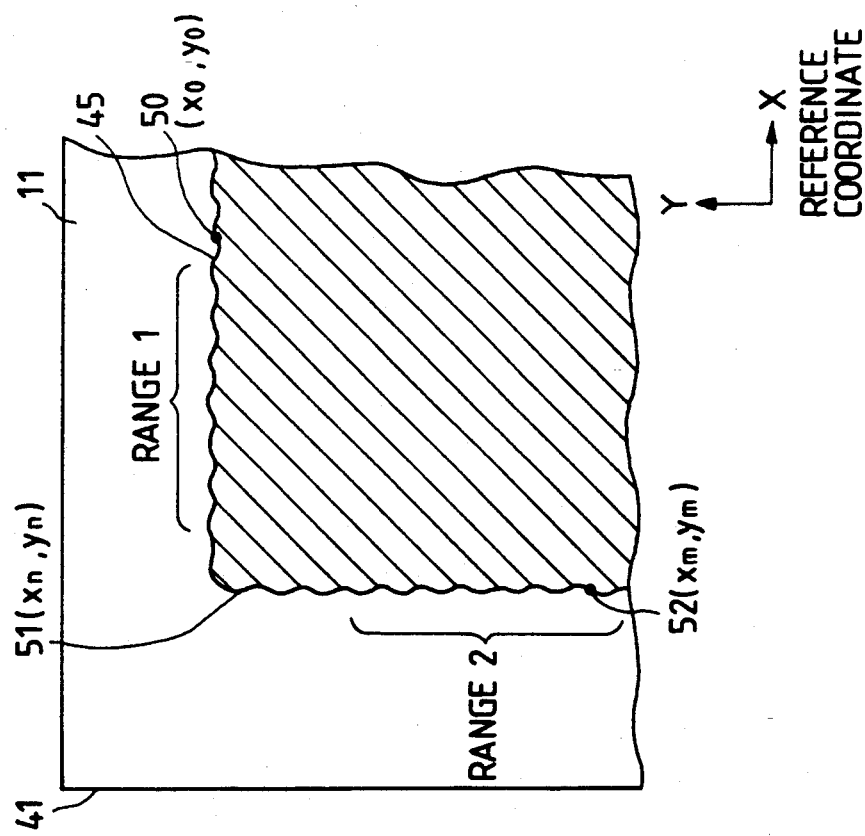
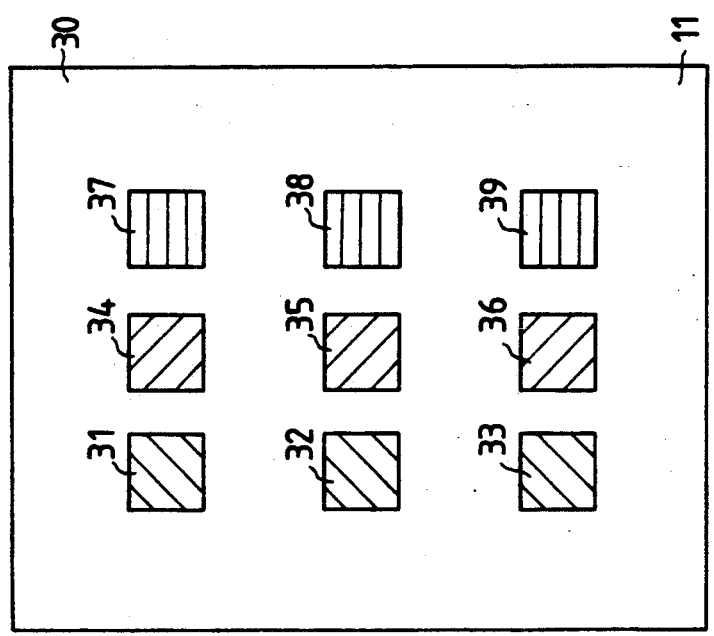

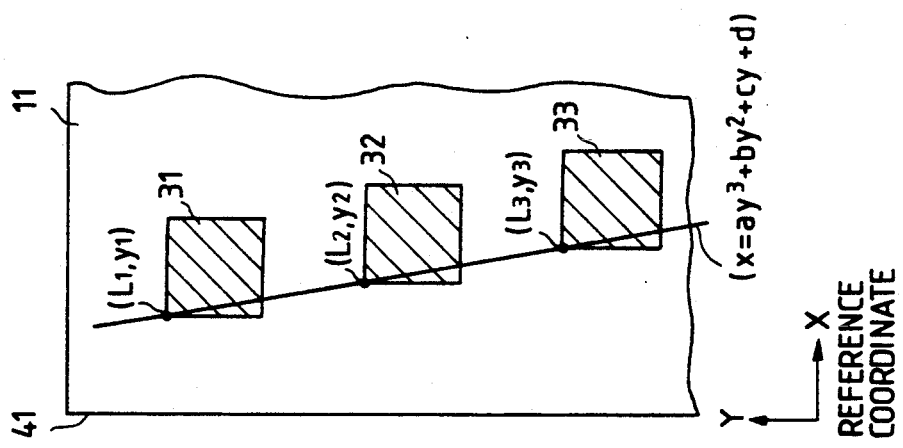
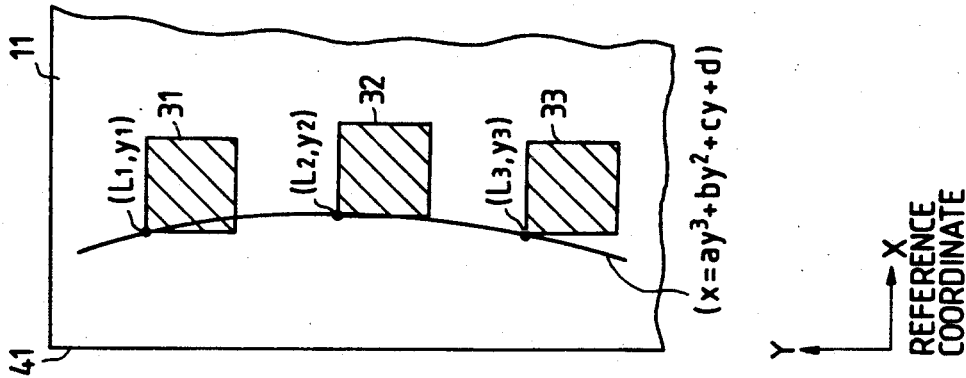

FIG. 16
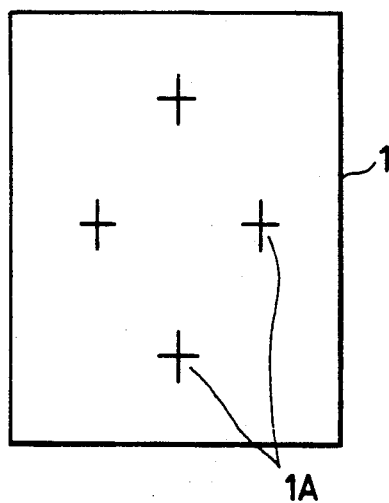
FIG. 15
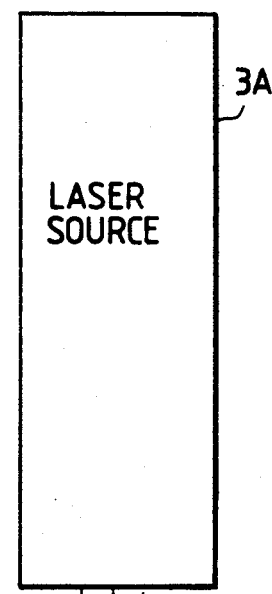
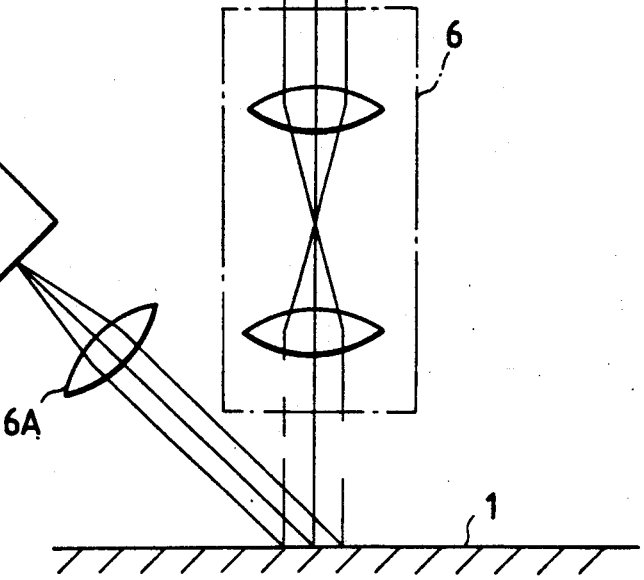

APPARATUS FOR MEASURING AMOUNT OF POSITIONAL DEVIATION OF A RECORDING SHEET

BACKGROUND OF THE INVENTION

This invention relates to an apparatus for measuring the amount of positional deviation of a print which is caused when a recording sheet is conveyed in a copying machine or printer, and more particularly to an apparatus for measuring the amount of positional deviation of a color print.

FIG. 14 shows the arrangement of an apparatus for measuring the amount of positional deviation of a recording sheet which has been disclosed, for instance, by Unexamined Japanese Patent Publication No. 242343/1985. As shown in FIG. 14, a recording sheet 1 on which cross marks 1A are recorded is placed on a table 2A which is moved on a base 2 in the directions of the arrow Y. A gate-shaped structural member 5 is provided above the table 2A, and is provided with a moving unit 5A which is movable in the directions of the arrow X, and the moving unit 5A has a laser unit 3, the lower end of which is coupled to a measuring unit 4. The measuring unit 4 is shown in FIG. 15 in detail. In FIG. 15, a light source 3A is a He-Ne laser, and its output laser beam is converted into a parallel laser beam by an optical system 6, which is applied to the recording sheet 1. The laser beam reflected from the surface of the recording sheet 1 is applied through an optical system 6A to a photo-electric conversion element 7; that is, it is detected by the photo-electric conversion element 7. Referring back to FIG. 14, a control unit 8 operates to move the table 2A and the moving unit 5A in accordance with the data, which have been set by a computer 9, in the directions of the arrows X and Y. The control unit 8 has means (not shown) for inputting data into the computer 9 which represent the positions of the table 2A and the laser unit 3. The control unit 8 further operates to control the operation of the laser source 3A and to subject the output of the photo-electric conversion element 7 to A/D (analog-to-digital) conversion and apply the output thus processed to the computer 9.

In the conventional apparatus thus constructed, the recording sheet 1, on which the cross marks 1A as shown in FIG. 16 have been recorded, is fixedly placed on the table 2A, and the positions of the cross marks 1A are detected with the detecting unit 4. The data on the cross marks thus detected are applied to the computer 9. In the computer 9, those data are compared with the data on correct position which have been inputted in advance, whereby the amount of deviation from the correct position is detected.

With the conventional apparatus for measuring the amount of positional deviation of a recording sheet, the recording sheet is not even depending on its surface condition; that is, of the recording sheet, the border line between the printed region or inked region and the background color region is not a straight line but a curved line irregular to about 50 μm. Accordingly, the position detected with the detecting unit 4 is large in error; that is, it is impossible to measure the amount of positional deviation with high accuracy.

The conventional apparatus is further disadvantageous in that, since it is necessary to move the measuring unit to each of the measuring positions with a moving system, the mechanical error of the moving system is added to the results of measurement.

SUMMARY OF THE INVENTION

In a apparatus for measuring an amount of positional deviation of a recording sheet according to a first aspect of the invention, the video image of a recording sheet is produced which has at least two patterns printed on its predetermined region which is illuminated by illuminating light selecting means for selecting an illuminating light beam color; image data obtained by converting the video image o into binary signal data are stored in an image memory; border coordinate data are obtained which represents the coordinates of a border where the image data changes greatly in signal level; an approximate straight line is set which approximates the borders of the patterns; a first sum of squares of the differences between the approximate straight line and the border coordinate data is obtained; an equation with the constants of the approximate straight line as variables, which is to obtain the first sum of squares is solved with respect to the variables, to obtain an equation for a straight line, whereby the positions of the patterns are detected which are each indicated by the intersection of at least two approximate straight lines; a cubic curve is set up which passes through the positions of at least two patterns; a second sum of squares of the differences between the cubic curve and the positions of at least two patterns with the edge of the recording sheet as a reference position is obtained; and an equation with the constants of said curvilinear function as variables which is to obtain the second sum of squares, is solved with respect to the variables, to obtain an equation for a curvilinear equation.

In an apparatus for measuring an amount of positional deviation of a recording sheet according to a second aspect of the invention, the video image of a recording sheet is produced which has two patterns of at least two different colors printed on its predetermined region; image data obtained by converting the video image into binary signal data are stored in an image memory; border coordinate data are obtained which represents the coordinates of a border where the image data changes greatly in signal level; an approximate straight line is set which approximates the borders of the patterns; a sum of squares of the differences between the approximate straight line and the border coordinate data is obtained; an equation with the constants of the approximate straight line as variables, which is to obtain the sum of squares is solved with respect to the variables, to obtain an equation for a straight line, whereby the positions of the patterns are detected which are each indicated by the intersection of at least two approximate straight lines, and the deviation of the distance between the two patterns which are spaced a predetermined distance from the predetermined distance is calculated.

In each of the above-described apparatuses, according to a third aspect of the invention, the video image pickup means comprises a plurality of video image pickup units which are accurate in positional relation.

Further in each of the above-described apparatus, according to a fourth aspect of the invention, the video image pickup means is made up of a drive mirror for controlling the application and reflection of an illuminating light beam, and a photo-electric conversion element for converting video images into electrical signal.

In the apparatus according to the first aspect of the invention, the equation for obtaining the sum of square of the differences between the border coordinate data of the patterns obtained from the video image and the approximate straight line approximating the borders of the patterns is solved with respect to the constants of the approximate straight line, so that a straight line is obtained which represents the borders best, and the positions of the patterns are each determined with at least two approximate straight lines. And a cubic curve is set up which passes through the positions of at least two patterns, and the equation representing the sum of squares of the differences between the cubic curve and the positions of the two patterns with the edge of the recording sheet as a reference position is solved with respect to the variables of the approximate straight line, to obtain a cubic curve equation. The cubic curve equation is utilized to detect the amount of positional deviation of the recording sheet in the direction of conveyance.

In the apparatus according to the second aspect of the invention, the positions of a plurality of patterns different in color which are spaced predetermined distances from one another are detected in the same manner as in the above-described apparatus, and the positional deviations of the colors are detected from the comparison of the positions of the patterns with the predetermined distances of the same patterns.

In the apparatus according to the third aspect of the invention, a plurality of patterns spaced apart from one another are converted into video images with a plurality of video image pickup units.

In the apparatus according to the fourth aspect of the invention, patterns on the recording sheet are scanned with the mechanism adapted to control the application and reflection of the illuminating light beam, so that they are converted into video images with the photoelectric conversion element.

BRIEF DESCRIPTION OF THE DRAWINGS

FIG. 2 is a plan view of a recording sheet under test.

FIG. 3 is a diagram showing the border of a pattern which is indicated by image data.

FIGS. 5B and 5C are plan views each showing the relationships between an approximate curve and the positions of the patterns.

FIG. 15 is an explanatory diagram showing the arrangement of a laser unit employed in the conventional apparatus shown in FIG. 14.

FIG. 16 is a plan view of a recording sheet under test in the conventional apparatus.

PREFERRED EMBODIMENTS OF THE INVENTION

Figure 1:
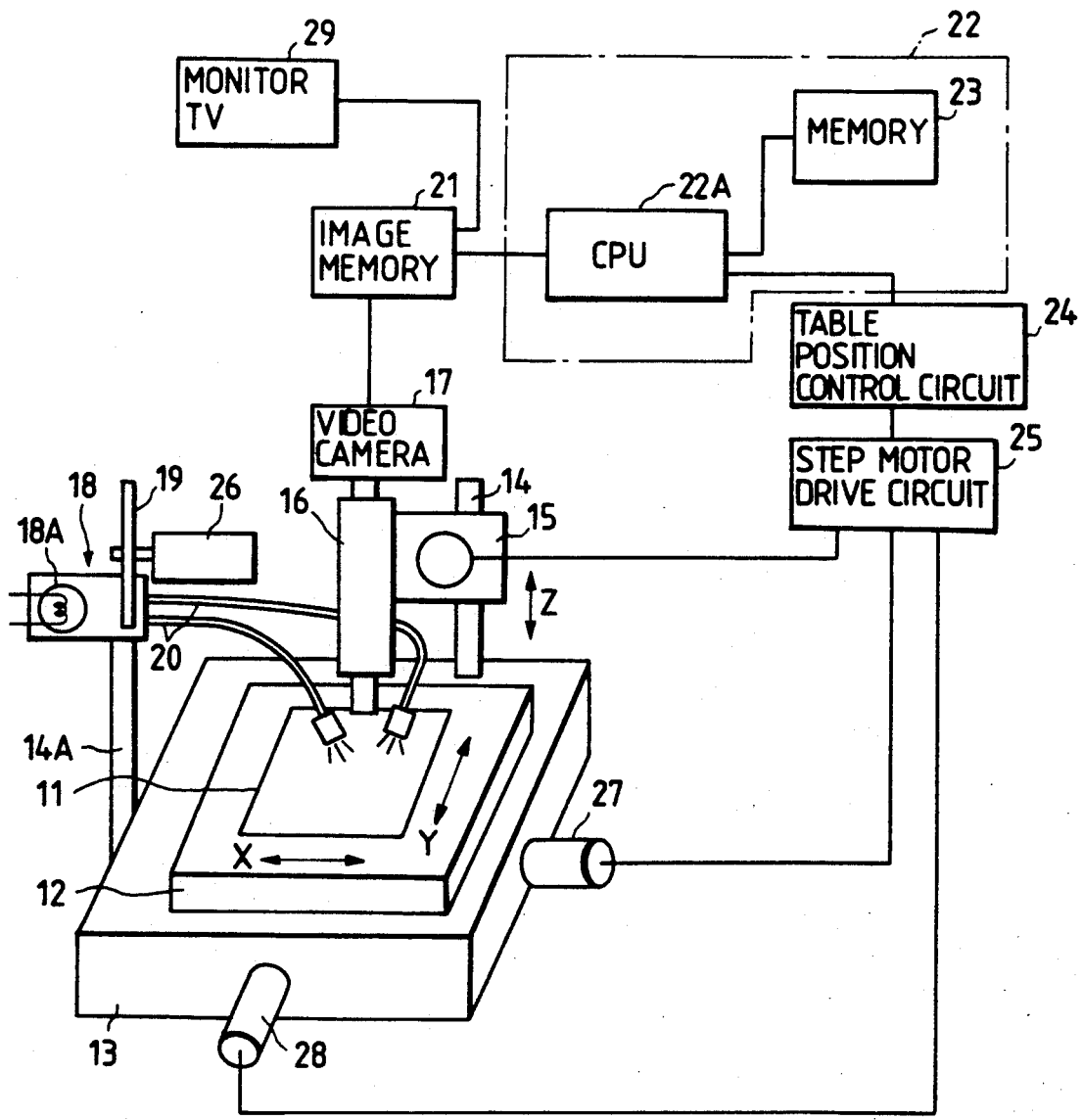
FIG. 1 is an explanatory diagram showing the arrangement of an apparatus to which the technical concept of this invention is applied.

FIG. 1 shows the arrangement of an apparatus to which the technical concept of this invention is applied. As shown in FIG. 1, an X-Y table 12 is provided on a base 13 in such a manner that it is moved in the directions of the arrows X and Y, and a recording sheet 11 which has been printed with a color printer is fixedly laid on the X-Y table 12. The surface of the X-Y table 12 is painted black in order to prevent the reflection of light. A column 14 is provided on the base 13, and a fine adjustment stand 15 is mounted on the column 14 in such a manner that it is movable vertically (as shown the directions of the arrow Z). A video camera having an optical system 16 is secured to the fine adjustment stand 15. Another column 14A is provided on the base 13, and an illuminating unit 18 is mounted on the column 14A. The illuminating unit 18 comprises: a light source 18A; a filter disk 19; and an electric motor 26 for rotating the filter disk 19.

Figure 11:
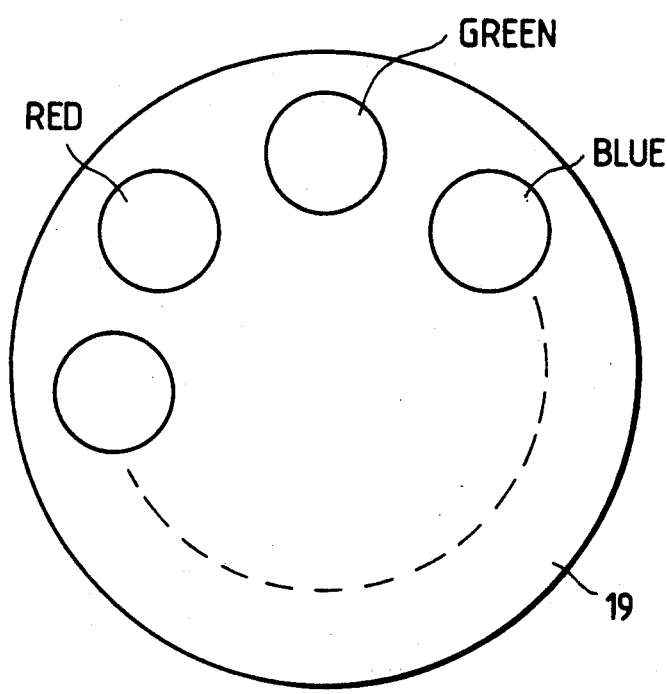
FIG. 11 is a plan view showing an example of a filter disk employed in the apparatus according to the invention.

Under the control of a CPU 22A, the motor 26 operates to turn the filter disk 19 to set a desired one of the filters of the filter disk 19 between the light source 18A and optical fibers 20. An example of the filter disk 19 is as shown in FIG. 11.

The output light of the light source 18A is applied through the optical fibers 20 to the recording sheet 11 under test, thus illuminating the surface of the recording sheet. The light source 18A is a white light source, and therefore as the filter disk 19 with a number of color filters is turned to a predetermined position, red, green and blue light beams are selectively outputted.

The apparatus further comprises: an image memory 21 which operates to convert an image detected by the video camera 17 into a digital signal, and to store the digital signal; and a computer system 22 which comprises the CPU 22A and a memory 23 to operate to process the data of the image memory 21 and store the results of process; and a monitor television set 29 which is a display unit for monitoring the image stored in the image memory 21. The CPU 22A applies a signal through a table position control circuit 24 to a step motor drive circuit, so as to drive three step motors 26, 27 and 28.

FIG. 2 shows a recording sheet to be measured. As shown in FIG. 2, nine square patterns are printed on the recording sheet. The patterns 31, 32 and 33 are yellow prints, the patterns 34, 35 and 36 are magenta prints, and the patterns 37, 38 and 39 are cyan prints.

Figure 9:
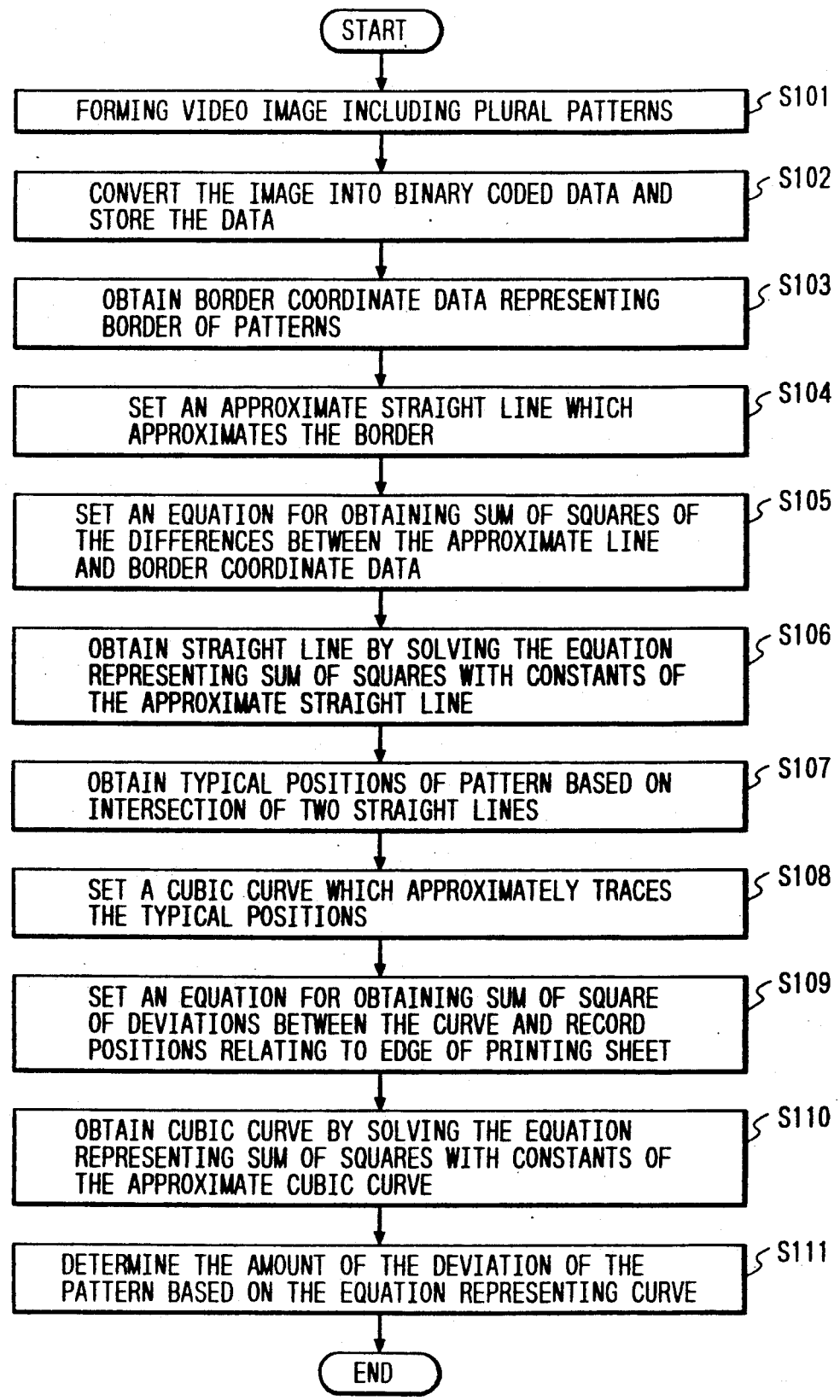
FIG. 9 is a flow chart for a description of the operation of an apparatus for measuring the amount of positional deviation of a recording sheet according to a first aspect of the invention.

Now, a measuring method employed in the embodiment will be described with reference to FIG. 9. In the following description of each process, the number in parentheses placed at the end of the description corresponds to the step number in the flow chart of FIG. 9.

First, the X-Y table 12 is moved until the pattern 31 appears in the central portion of the field of vision of the video camera 16. Under the control of the computer system 22, the step motor 26 provided for the filter disk 19 is turned, so that the blue filter is set between the white light source 18 and the optical fibers 20. As a result, the blue light is applied to the surface of the recording sheet 11. The blue light is reflected from the white background 30 of the recording sheet 11, but it is absorbed by the yellow pattern 31. Hence, at the border line between the background of the recording sheet 11 and the pattern 31, the degree of reflection of light is abruptly changed, and this condition is detected by the video camera 17 (Step 101).

The image thus detected is converted into image data which are binary-coded (with "1" and "0") according to a predetermined threshold value, which are stored in the image memory 21 (Step 102). The capacity of the image memory 21 is for instance 512 words×512 words. The border line is located between "1" and "0" in the image data as shown in FIG. 3 (Step 103). In FIG. 3, a shaded region is a region of data "0", and the remaining region not shaded is a region of data "1". In general, the border line between the two regions is zigzagged due to the unevenness of the sheet.

In FIG. 3, for convenience in description, the part of the border line between the points 50 and 51 will be referred to as "a range 1, and the part of the border line between the points 51 and 52, as "a range 2". The range 1 and the range 2 are represented by expressions (1) and (2) which are border line coordinate data groups in an X-Y coordinate system, respectively.

$$(x_0, y_0), (x_1, y_1), \ldots, (x_{n-1}, y_{n-1}), (x_n, y_n) \quad (1)$$

$$(x_n, y_n), (x_{n-1}, y_{n-1}), \ldots, (x_m, y_m) \quad (2)$$

Figure 4:
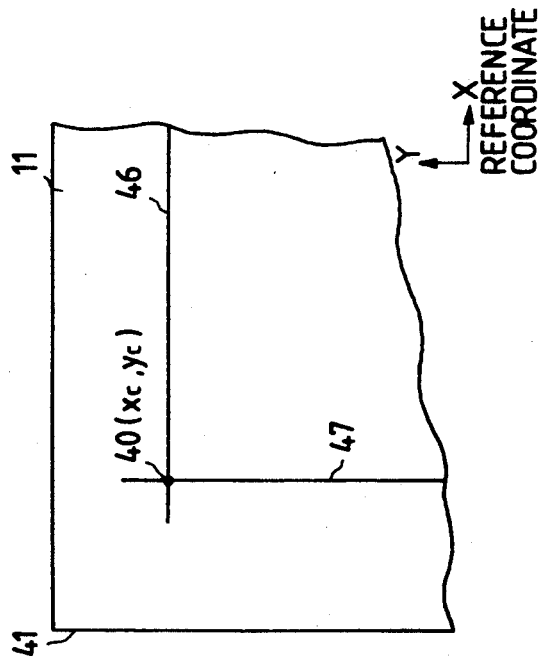
FIG. 4 is a diagram showing straight lines approximating the border.

These data groups may be presented with approximate lines in the X-Y coordinate system; that is, they can be represented with two straight lines 46 and 47, respectively, as shown in FIG. 4. These lines 46 and 47 are represented by the following equations (3) and (4), respectively (Step 104):

$$y = ax + b \quad (3)$$

$$y = dx + c \quad (4)$$

Since the pattern is square, the two lines are perpendicular to each other. Hence, the following equation (5) is established:

$$a * d = -1 \quad (5)$$

Next, the square sum (Z) of the deviation e between the two straight lines and the border coordinate data of the ranges 1 and 2 is obtained (Step 105). The deviation e is equal to the distance between the border coordinate data (x, y) and the proximate line. In the case where the inclination of the border line 45 with respect to the X-Y coordinate system is small, the deviations $e_i$ and $e_j$ of the ranges 1 and 2 can be obtained according to the following equations (6) and (7), respectively:

$$e_i = y_i - (ax_i + b) \quad (6)$$

$$e_j = x_j - (ay_j + c) \quad (7)$$

Hence, the square sum (Z) can be represented by the following equation (8) (Step 105):

$$Z = \sum_{i=0}^{m} (y_i - ax_i - b)^2 + \sum_{i=0}^{m} (x_j + ay_j - c)^2 \quad (8)$$

The equation (8) is a function with constants a, b, c and n as variables; that is, f(a, b, c, n). Hereinafter, for simplification in description, the function will be referred to merely as "a function f", when application). Accordingly, the two straight lines approximating the border coordinate data $(x_o, y_o), \ldots, (x_m, y_m)$ can be obtained by solving the following equation (9), or simultaneous equations with four unknown representing the partial differentiation of the function f with the variable a, b, c and n (Step 106):

$$\left. \begin{array}{l} \frac{\partial f}{\partial a} = 0 \\ \frac{\partial f}{\partial b} = 0 \\ \frac{\partial f}{\partial c} = 0 \\ \frac{\partial f}{\partial d} = 0 \end{array} \right\} \quad (9)$$

By defining the coordinates $(x_c, y_c)$ of the intersection 40 of the two straight lines 46 and 47 thus obtained as the position of the pattern, the border line of the pattern printed can be specified (Step 107). The positions of the other patterns 32 and 33 can be obtained in the same manner. In the equation (9), the condition is given that each partial differentiation is zero; however, a different condition may be given.

As for the remaining color patterns; that is, as for the magenta patterns 34, 35 and 36, and the cyan patterns 37, 38 and 39, the filter disk 19 is turned to select the respective filters; that is, the measurements are carried out with the illuminating light changed in color.

Now, a method of obtaining the position of the edge 41 of the recording sheet will be described.

First, the X-Y table is moved until the edge 41 of the recording sheet appears in the central portion of the field of vision of the video camera. The X-Y table, being of the black plate, absorbs the blue, green and red illuminating light beams, and therefore only the recording sheet reflects light. The light applied by the illuminating unit is abruptly changed in the degree of reflection at the edge of the recording sheet (the border line of the recording sheet with respect to the X-Y table), so that the image data is binary-coded according to a predetermined threshold value. Similarly as in the above-described case, the coordinate data groups representing the border of the recording sheet may be approximated with a straight line. The straight line is represented by the following equation (10):

$$x = ay + b \quad (10)$$

From the equation (10), the deviation $e_i$ between this straight line and the border coordinate data is:

$$e_i = x_i - (ay_i + b) \tag{11}$$

The square sum (Z) of the deviation is:

$$Z = \sum_{i=0}^{m} (x_i - ay_i - b)^2. \tag{12}$$

The square sum (Z) is a function g with a and b as variables [function g(a, b)] (hereinafter referred to as "a function g", when applicable); that is, it can be obtained by solving the following simultaneous equations (13) representing the partial differentiation of the function g with variables a and b:

$$\left. \begin{array}{l} \frac{\partial g}{\partial a} = 0 \\ \frac{\partial g}{\partial b} = 0 \end{array} \right\} \tag{13}$$

Figure 5A:
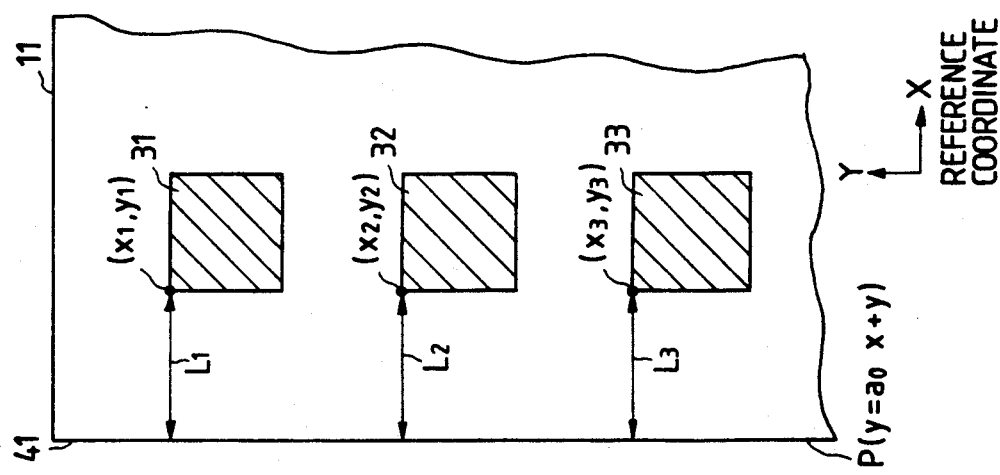
FIG. 5A is a plan view of the recording sheet, showing the measurement of the positions of patterns in detail.

Next, the distance is obtained which is between the pattern position coordinates $(x_c, y_c)$ and the approximate straight line $(x = ax + b)$ of the recording sheet's edge 41 which are obtained in the preceding step. The distance is measured at several positions with respect to the recording sheet. For instance, in the case of FIG. 5A, the measurement is carried out for three patterns 31, 32 and 33. In FIG. 5A, the positions of the patterns 31, 32 and 33 ares represented by $(x_1, y_1)$, $(x_2, y_2)$ and $(x_3, y_3)$, respectively, and the distances of these positions from the edge of the recording sheet are represented by L1, L2 and L3, respectively. From the positions of those points and the distances thereof, the conveyance of the recording sheet can be approximated with a curve. With the curve for approximation as a cubic curve, the following equation (14) is assumed (Step 108):

$$x = ay^3 + by^3 + cy + d \tag{14}$$

With the edge of the recording sheet as the reference for the X-coordinate, the record positions of the patterns are:

Pattern 31 ... (L1, $y_1$)
Pattern 32 ... (L2, $y_2$)
Pattern 33 ... (L3, $y_3$)

Referring to those data, a curvilinear approximation is carried out according to a method of least squares, so that the square sum (Z) of the deviations between the curve and the record positions (Step 109). The deviation $e_i$ is represented by the following equation (15):

$$e_i = x_i - (ay_i^3 + by_i^2 + cy_i + d) \tag{15}$$

Therefore, the square sum (Z) of the deviations can be obtained according to the following equation (16):

$$Z = \sum_{i=1}^{3} (x_i - ay_i^3 - by_i^2 + cy_i - d) \tag{16}$$

The equation (16) is a function h with a, b, c and d as variable [function h(a, b, c, d)] (hereinafter referred to as "a function (h)", when applicable). The values a, b, c and d can be obtained by solving the following simultaneous equations (17) representing the partial differentiation of the function with variables a, b, c and d (Step 110):

$$\left. \begin{array}{l} \frac{\partial h}{\partial a} = 0 \\ \frac{\partial h}{\partial b} = 0 \\ \frac{\partial h}{\partial c} = 0 \\ \frac{\partial h}{\partial d} = 0 \end{array} \right\} \tag{17}$$

When the assumed cubic equation includes terms of second and third degrees, then the recording sheet is caused to meander during conveyance as shown in FIG. 5B; and when it is of terms of first degree only (or $a \div 0$, and $b \div 0$), the recording sheet is conveyed obliquely as shown in FIG. 5C. The offset of the recording sheet can be determined from the value of the constant d (Step 111). In the equation (17), the condition is given that each partial differentiation is zero; however, a different condition may be given.

In the above-described measurements, the recording sheets were white or yellow. In order to measure the condition of record when a magenta recording sheet is employed, the green filter is selected, and the measurement is carried out by using the patterns 34, 35 and 36 in FIG. 2 in the same manner as in the case of the yellow recording sheet. In order to measure the condition of record when a cyan recording sheet is employed, the red filter is selected, and the measurement is carried out by using the patterns 37, 38 and 39 in FIG. 2 in the same manner as in the above-described case.

Next, another embodiment of the invention; i.e. an example of an apparatus for measuring the amount of positional deviation of a recording sheet according to a second aspect of the invention will be described.

Figure 6:
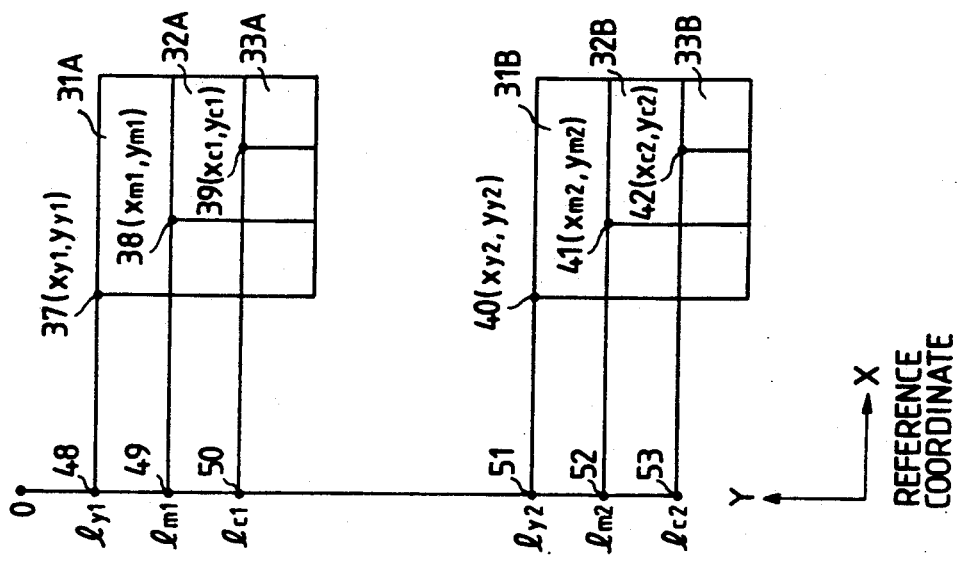
FIG. 6 is a plan view of a recording sheet, showing the arrangement of color patterns.

In the embodiment, as shown in FIG. 6, a yellow square mark 31A is provided on a recording sheet under test, and a magenta square mark 32A smaller in area than the yellow square mark 31A is provided on the yellow square mark 31A, and a cyan square mark 33A smaller in area than the magenta square mark 31B is provided on the latter 31B, these marks forming a first assembly. In addition, a yellow square mark 31B, an magenta square mark 32B and a cyan square mark 33B are provided on the recording sheet in the same manner as the assembly of the yellow, magenta and cyan square marks 31A, 32A and 33A, thus forming a second assembly which is spaced a predetermined distance from the first assembly.

Figure 7:
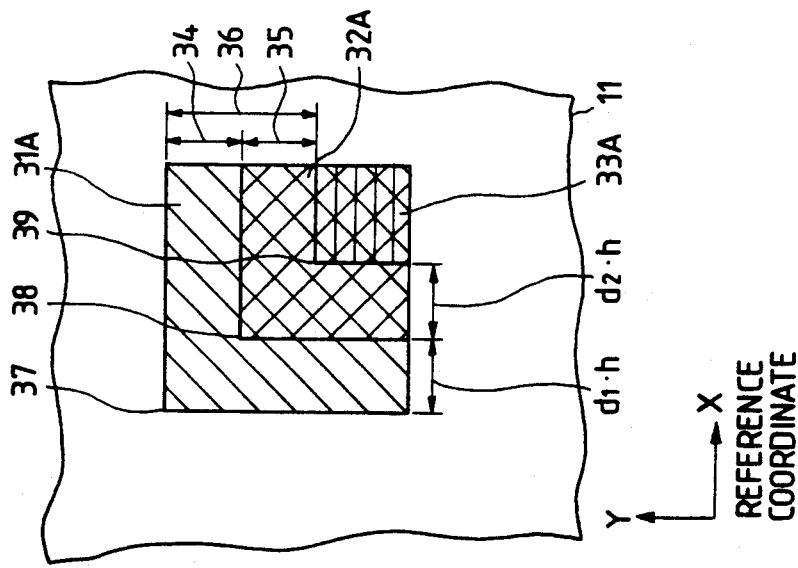
FIG. 7 is a plan view of the recording sheet, showing the arrangement of a color pattern in detail.
Figure 10:
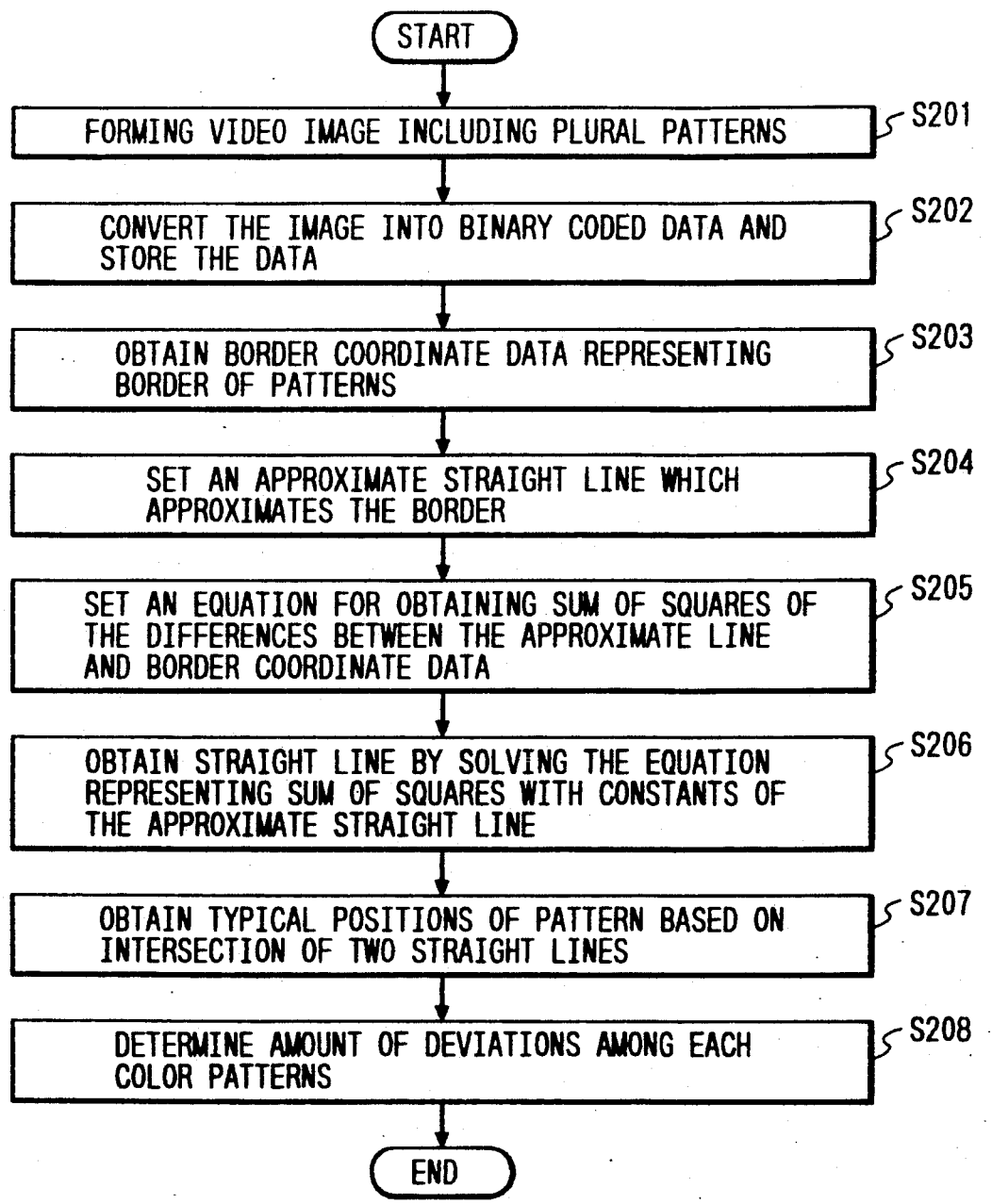
FIG. 10 is also a flow chart for a description of the operation of an apparatus for measuring the amount of positional deviation of a recording sheet according to a second aspect of the invention.

As shown in FIG. 10, the positions of the points 37, 38, 39, 40, 41 and 42 representing the positions of those square marks are obtained in the method which is similar to that employed in the first invention described above. Steps 201 through 207 in FIG. 10 are substantially equal to Steps 101 through 107 in FIG. 9. The positions of these points 37 through 42 can be represented by using an X-Y coordinate system; for instance the point $(x_{xl}, y_{yl})$ represents a first particular point of the yellow square mark. Next, the distances between the points are compared with reference record distances. The reference record distances are expressed by the numbers of dots of the print head (such as a thermal head) in the direction of the arrow X in FIG. 6. That is, as shown in FIG. 7, the amount of deviation $\Delta x_{ym}$ in distance between the point 37 of the yellow mark 31A and the point 38 of the magenta mark 32A in the direction of the arrow X is represented by the following equation (18):

$$\Delta x_{ym} = (x_{ml} - x_{yl}) - d_1 h \tag{18}$$

where $d_l$ is the number of dots between the point 37 and the point 38, h is the reference pitch of the dots, and $x_{ml}$ and $x_{yl}$ are the coordinates of the first particular points of the yellow mark and the magenta mark, respectively.

The amount of deviation $\Delta x_{mc}$ between the point 38 of the magenta mark 32A and the point 39 of the cyan mark 33A is represented by the following equation (19) (Step 208):

$$\Delta x_{mc} = (x_{cl} - x_{ml}) - d_2 h \tag{19}$$

where $d_2$ is the number of dots between the point 38 and the point 39, and h is the reference pitch of the dots.

On the other hand, an amount of shift in the direction of the arrow Y is a sheet feed distance, and it is determined from mechanical factors such as for instance the diameter of the platen. Since different printers have different platen diameters, the amount of shift depends on the printer employed; that is, the amount of shift is not constant. The Y coordinates of the borders of the yellow, magenta and cyan marks, which include the above-described error can be represented by the following equations (20), (21) and (22), respectively:

$$y'_y = l_{y1}(L + \Delta L_y) \tag{20}$$
$$y'_m = l_{m1}(L + \Delta L_m) \tag{21}$$
$$y'_c = l_{c1}(L + \Delta L_c) \tag{22}$$

where $l_{yl}$ is the number of dots counted from the predetermined original point of the yellow pattern, $l_{ml}$ is the number of dots counted from the predetermined original point of the magenta pattern, and $l_{cl}$ is the number of dots counted from the predetermined original point of the cyan pattern; L is the standard feed distance of one line; and $\Delta L_y$, $\Delta L_m$ and $\Delta L_c$ are the differences in distance between the lines of the yellow, magenta and cyan patterns.

The amount of deviation between the yellow pattern and the magenta pattern can be represented by the following equation (23):

$$\Delta y_{ym} = (y_{ml} - y_{yl}) - (y'_m - y'_y) \tag{23}$$

In the equation (23), the first term on the right side is the actual distance between the yellow pattern 31A and the magenta pattern 32A, and the second term is the distance between the yellow pattern 31A and the magenta pattern 32A where no color shift occurs.

The substitution of the equations (20) and (21) into the equation (23) results in the following equation (24):

$$\begin{aligned}\Delta y_{ym} &= (y_{m1} - y_{y1}) - \{l_{m1}(L + \Delta L_m) - l_{y1}(L + \Delta L_y)\} \\ &= (y_{m1} - y_{y1}) - (l_{m1} - l_{y1})L - l_{m1}\Delta L_m + l_{y1}\Delta L_y \\ &= (y_{m1} - y_{y1}) - (l_{m1}L - l_{y1}L) - (l_{m1}\Delta L_m - l_{y1}\Delta L_y)\end{aligned} \tag{24}$$

In this equation (24), an mechanical error E can be represented by the following equation (25)

$$E = l_{yl}\Delta L_y - l_{ml}\Delta L_m \tag{25}$$

In the case where the number of record lines is constant, the differences in distance between the lines of the colors are as indicated by the following equation (26):

$$\left.\begin{aligned}\Delta L_y &= \frac{y_{y2} - y_{y1}}{l_{12}} - L \\ \Delta L_m &= \frac{y_{m2} - y_{m1}}{l_{12}} - L \\ \Delta L_c &= \frac{y_{c2} - y_{c1}}{l_{12}} - L\end{aligned}\right\} \tag{26}$$

where $l_{12}$ is the distance between the patterns 31A and 32B. Accordingly, the amount of color deviation $\Delta y_{ym}$ between the yellow pattern and the magenta pattern can be represented by the following equation (27) which is obtained by substituting the equation (26) into the equation (23):

$$\Delta y_{ym} = (y_{m1} - y_{y1}) - \left[l_{m1}\frac{y_{m2} - y_{m1}}{l_{12}} - l_{y1}\frac{y_{y2} - y_{y1}}{l_{12}}\right]. \tag{27}$$

Similarly, the amount of deviation $\Delta y_{mc}$ between the magenta pattern and the cyan pattern can be represented by the following equation (28):

$$\Delta y_{mc} = (y_{c1} - y_{m1}) - \left[l_{c1}\frac{y_{c2} - y_{c1}}{l_{12}} - l_{m1}\frac{y_{m2} - y_{m1}}{l_{12}}\right] \tag{28}$$

With the conventional apparatus, the amount of deviation measured includes the mechanical error E; that is, it is impossible to measure the amount of deviation which includes no mechanical error E. On the other hand, in the embodiment of the invention, the amount of deviation ($\Delta y_{ym}$) measured includes no mechanical error E.

In the above-described embodiment, in order to obtain the pattern border data, blue light, green light and red light are successively applied onto the recording sheet 11 by using the blue, green and red filters of the filter disk 19. However, if a color video set is used with a white light beam, then three color image processes can be carried out simultaneously.

Figure 8A:
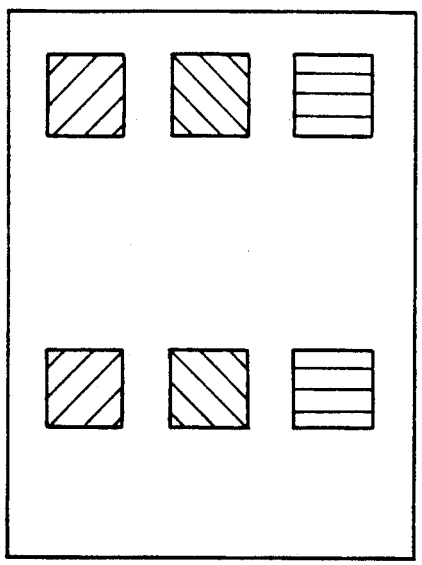
FIGS. 8A to 8D are plan views of recording sheets, showing examples of the arrangement of color patterns.
Figure 8B:
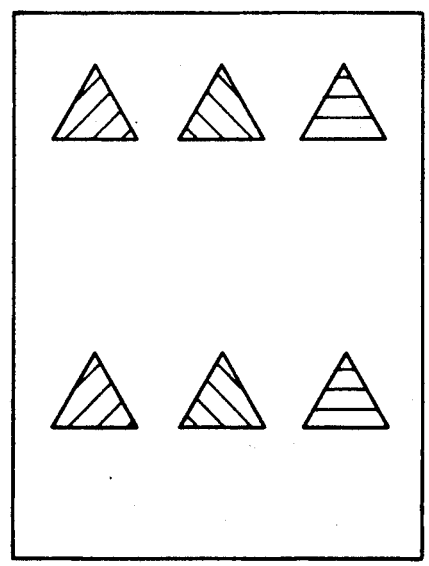
Figure 8C:
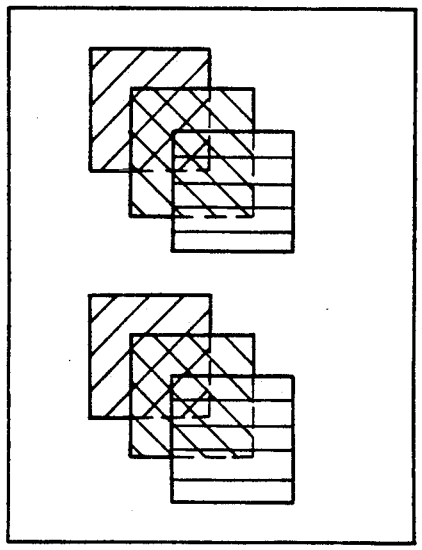
Figure 8D:
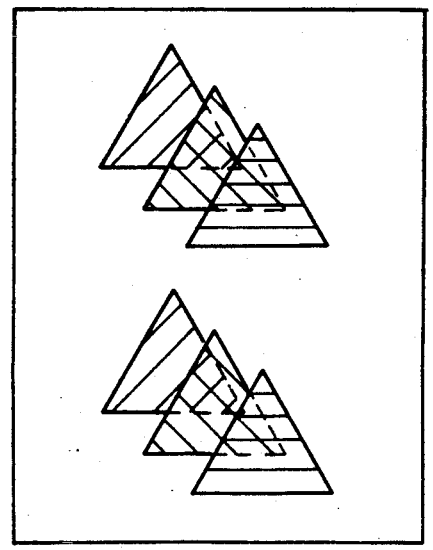

Furthermore, in the above-described embodiment, the white light beam is divided into blue, green and red light beams with the color filters of the filter disk. However, the same effect can be obtained by using a prism. In addition, the light source may be a He-Ne laser which oscillates a light beam having a particular wave length. In addition, in the above-described embodiment, the color patterns are formed on the recording sheet in which the yellow, magenta and cyan square marks are laid one on another in such a manner that they are spaced predetermined distances from one another. However, they may be geometrical patterns such as yellow, magenta and cyan squares as shown in FIG. 8A which are separately printed on the recording sheet; or they may be yellow, magenta and cyan triangles as shown in the FIG. 8B which are printed in the same manner; or they may be yellow, magenta and cyan squares or triangles which are overlapped with one another in such a manner that they are spaced a predetermined distance from one another, as shown in FIGS. 8C and 8D.

Figure 12:
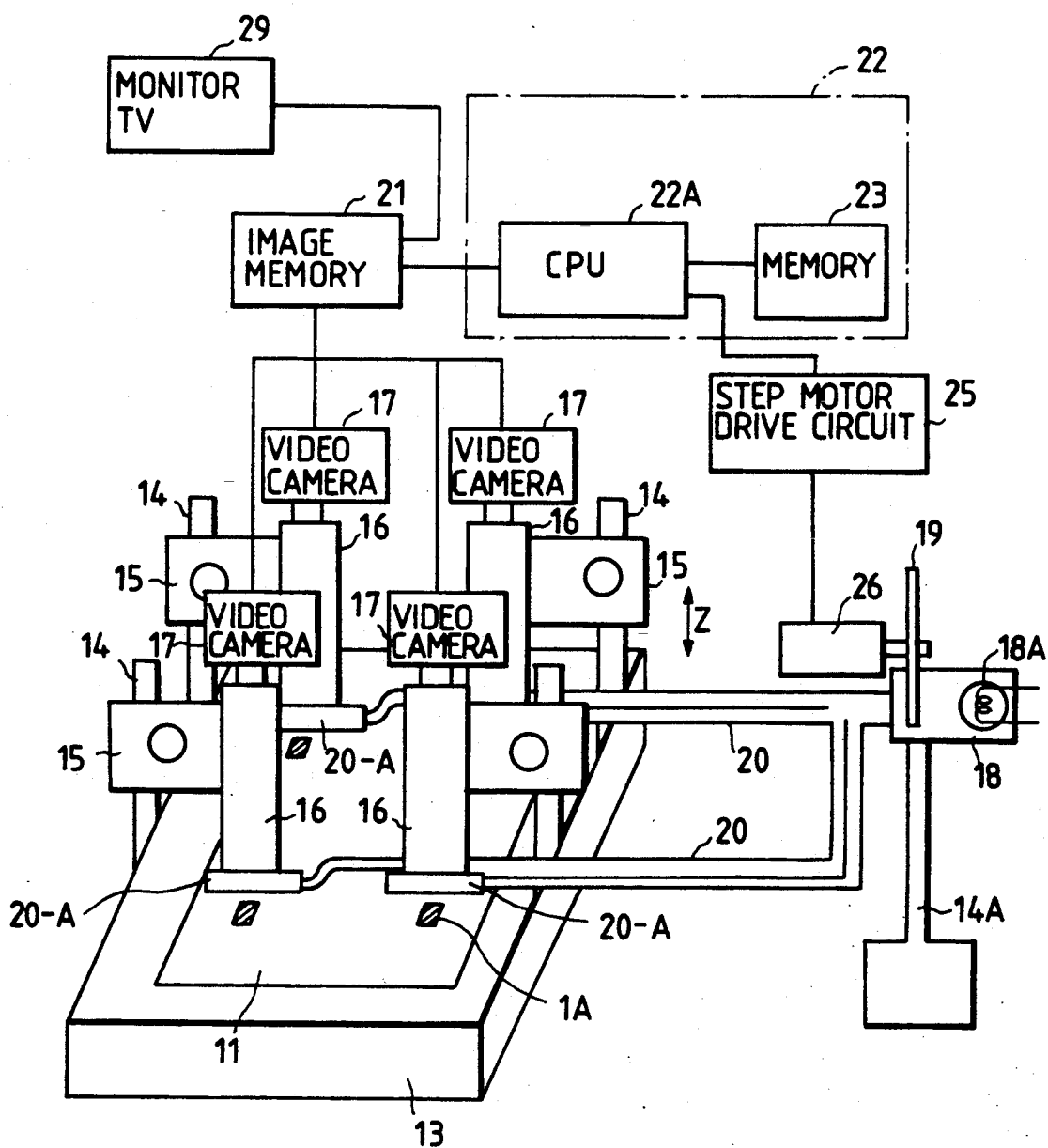
FIG. 12 is an explanatory diagram showing an apparatus for measuring the amount of positional deviation of a recording sheet according to a third aspect of the invention.

FIG. 12 shows an example of an apparatus for measuring the amount of positional deviation of a recording sheet according to a third aspect of the invention.

In FIG. 12, reference characters 1A, 11, and 13 through 29 are the same as those which have been described above. A plurality of image pickup means each comprising a video camera 17, an optical system 16, and a fine adjustment stand 17 are provided. The image pickup means shoot different portions of the recording sheets, and their positional relation is accurately read by the CPU 22 with the aid of the memory 23. Similarly as in the cases of the apparatuses according to the first and second aspects of the invention, the images detected by the video cameras 17 are computer-processed, as a result of which the borders of the images are calculated, and the distances between the images detected by the video cameras are calculated.

The above-described apparatus according to the third aspect of the invention is advantageous, when compared with the apparatuses according to the first and second aspects of the invention, in that it is unnecessary to move an object under test in a horizontal plane, and accordingly the measurement can be achieved quickly, and that the apparatus is free from the error in movement which otherwise may be caused by the mechanical drive system including the step motors 26 and 27, and therefore the measurement can be achieved with high accuracy.

Figure 13:
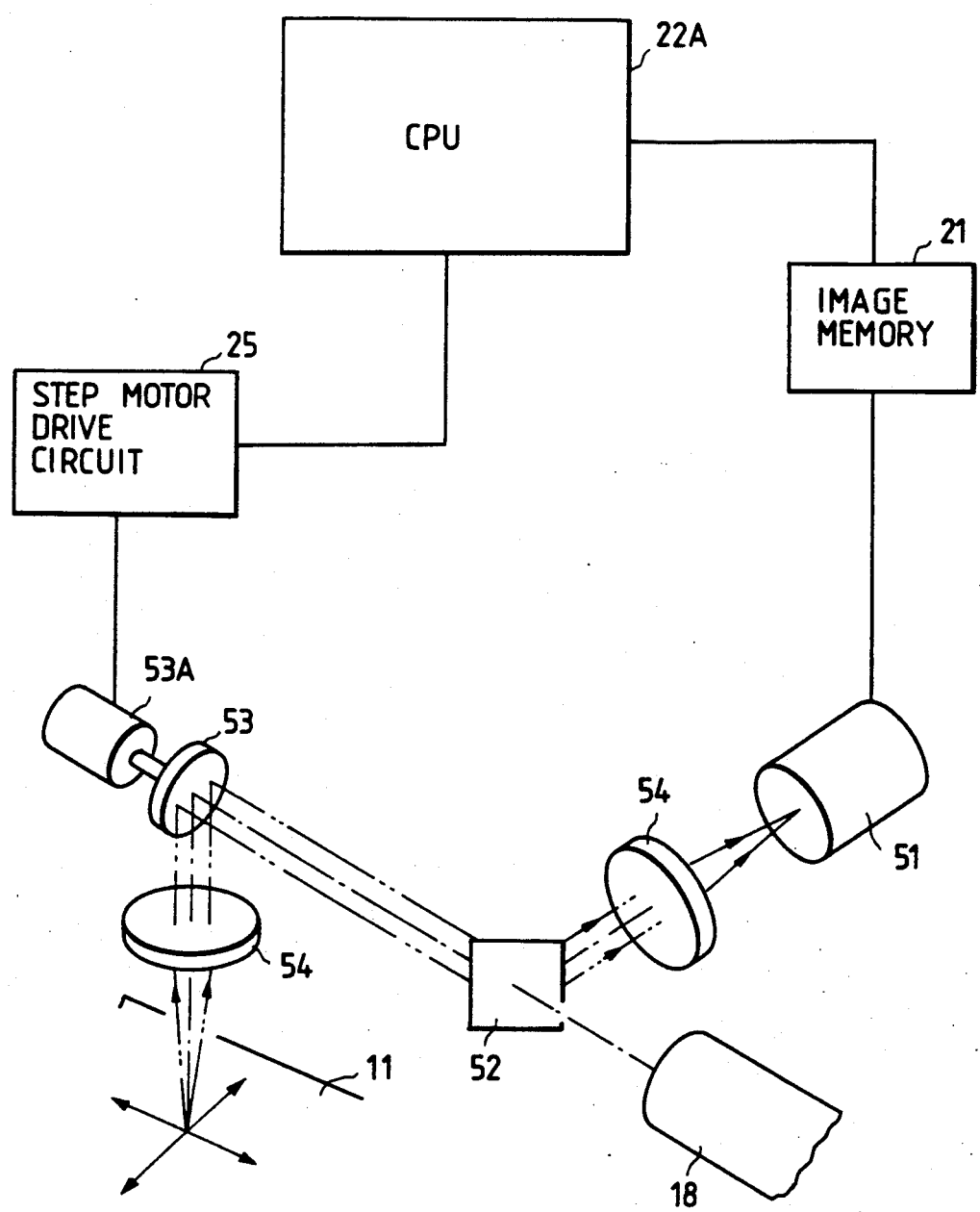
FIG. 13 is an explanatory diagram outlining the arrangement of image pickup means in an apparatus for measuring the amount of positional deviation of a recording sheet according to a fourth aspect of the invention.
Figure 14:
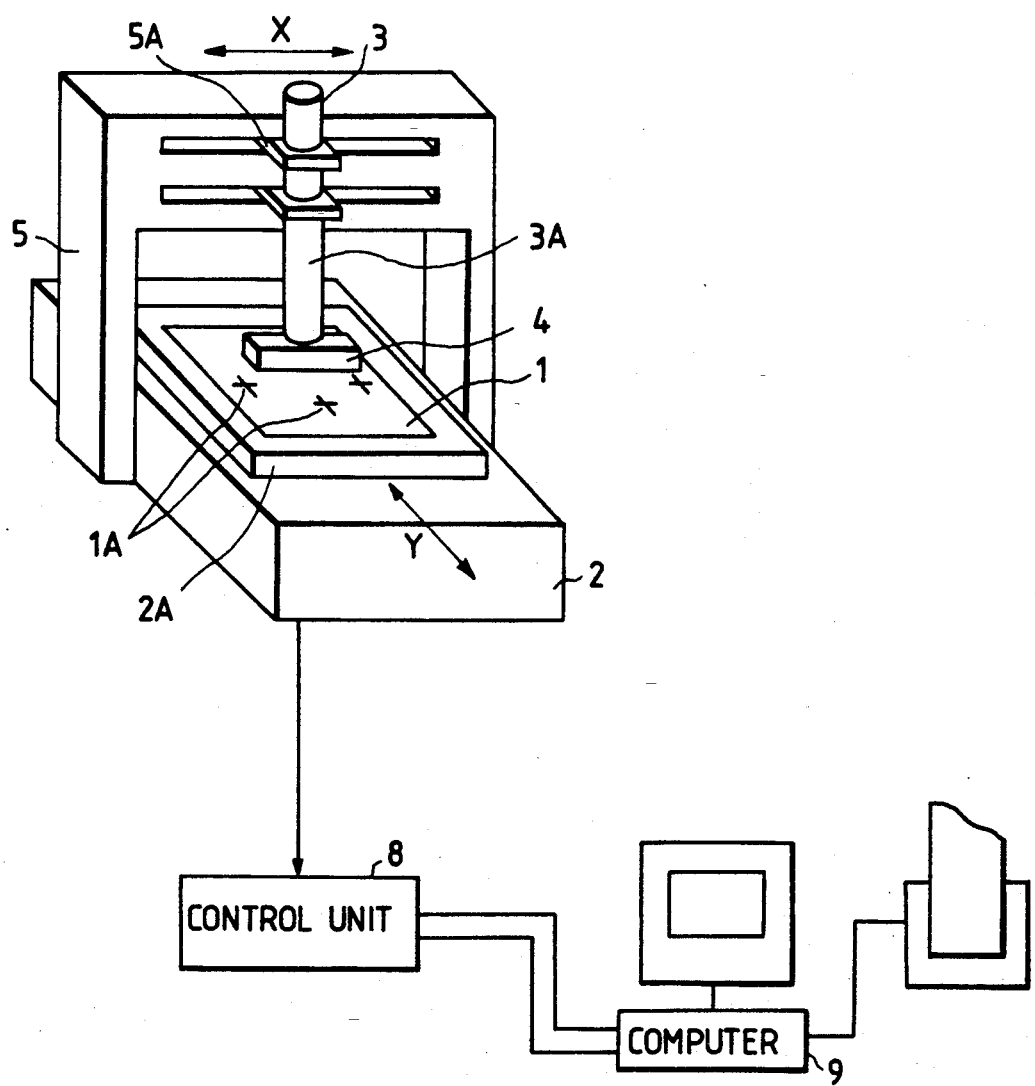
FIG. 14 is an explanatory diagram showing a conventional apparatus for measuring the amount of positional deviation of a recording sheet.

FIG. 13 is an explanatory diagram showing essential components of image pickup means in an example of an apparatus for measuring the amount of positional deviation of a recording sheet according to a fourth aspect of the invention.

In FIG. 13, reference characters 11, 18, 21, 22A and 15 designate the same components as those in the above-described embodiments of the invention; 51, a photo-electric conversion element; 52, a half mirror; 53, a drive mirror; and 54, optical lenses 54. The photo-electric conversion element 51, the half mirror 52, the drive mirror 53 and the optical lenses 54 are mounted on a fine adjustment stand 15, instead of the optical system 16 and the video camera 17 shown in FIG. 1. In the image pickup means shown in FIG. 4, the output light beam of the light source 18 is applied through the half mirror 52 to the drive mirror 53, where it is reflected. The light beam thus reflected is focused on the measurement surface with the optical lens 54. The light beam reflected from the measurement surface is applied through the optical lens 54 and the drive lens 53 to the half mirror, where it is reflected. The light thus reflected is applied through the optical lens 54 to the photo-electric conversion element. The image data obtained through this operation is of a dot; however, the illuminating portion can be scanned by gradually changing the angle of reflection of the drive mirror 53. In this operation, the angle of the drive mirror 53 is changed at a suitable speed, a clock frequency for converting the output image data of the photo-electric conversion element into binary signals is increased, so that the accuracy of detection of the coordinates of the border is increased where the signal level is changed greatly, whereby the accuracy of measurement is increased as much.

In the apparatus according to the first aspect of the invention, light beams suitable for the colors of the recording sheet and the patterns are applied to the recording sheet to record the patterns, and the patterns thus recorded are converted into electrical signals, which are stored in the image memory. And, from the image data stored in the image memory, the border coordinate data are obtained, and the differences between the approximate straight line and the coordinate data are obtained. The equation representing the square sum of the differences thus obtained is solved, so that the equation representing the border is obtained, and the border is determined. Thus, the borders of the patterns can be detected with high accuracy in spite of the uneven surface of the recording sheet. The illuminating light beam can be changed in color according to the colors of the recording sheet and the patterns. Hence, with the apparatus, the measurement can be carried out no matter what the colors of the recording sheet and the pattern are.

With the apparatus according to the second aspect of the invention, the amount of deviation between colors can be measured without being adversely affected by the mechanical error which, for instance, is attributed to the platen of the printer.

The apparatus according to the third aspect of the invention comprises a plurality of video image pickup means. Therefore, with the apparatus, it is unnecessary to move the video image pickup section to each of the positions of measurement. Hence, the speed of measurement is increased as much, and the difficulty is eliminated that the measurement is adversely affected by the error which is due to the mechanism adapted to move the video image means; that is, the measurement can be achieved with high accuracy.

The apparatus according to the fourth aspect of the invention comprises the video image pickup means including the drive mirror and the photo-electric conversion element, which allows an increase in the accuracy of measurement, thus enabling the measurement to be performed with high accuracy.

What is claimed is:

1. An apparatus for measuring an amount of positional deviation of a recording sheet, comprising:

illuminating light selecting means for selecting an illuminating light beam suitable for the color of a predetermined pattern on a recording sheet;

video image pickup means for forming a video image of a recording sheet on which a plurality of patterns are printed;

means for converting said vide image into binary signal data which are stored in an image memory;

border coordinate data generating means for producing border coordinate data representing the coordinates of a border where said image data changes greatly in signal level;

means for setting data of an approximate straight line which approximates a line connecting the borders of said patterns;

means for obtaining a first sum of squares of the differences between said approximate straight line and said border coordinate data;

means for solving a function with the constants of said approximate straight line as variables, which is to obtain said first sum of squares, with respect to said variables, to obtain an equation for a straight line;

means for calculating a typical position of said pattern which is the intersection of at least two approximate straight lines;

means for establishing a curvilinear function for a curve connecting the typical positions of said plurality of patterns;

means for obtaining a second sum of squares of the differences between said curvilinear function and the typical positions of said plurality of patterns; and means for solving an equation with the constants of said curvilinear function as variables to obtain second sum of squares with respect to said variables, to obtain an equation for a curvilinear function.

2. An apparatus as claimed in claim 1, wherein said video image pickup means are plurally provided, and the positional relationships of which can be detected with high accuracy.

3. An apparatus as claimed in claim 1, wherein said video image pickup means comprises a mechanism for controlling irradiation and reflection of an illuminating light beam and a photo-electric conversion element.

4. An apparatus for measuring an amount of positional deviation of a recording sheet, comprising:

illuminating light selecting means for selecting an illuminating light beam suitable for the color of a predetermined pattern on a recording sheet;

video image pickup means for forming a video image of a recording sheet on which a plurality of patterns made up of at least two different colors are printed;

means for converting said vide image into binary signal data which are stored in an image memory;

border coordinate data generating means for producing border coordinate data representing the coordinates of a border where said image data changes greatly in signal level;

means for setting data of an approximate straight line which approximates a line connecting the borders of said patterns;

means for obtaining a first sum of squares of the differences between said approximate straight line and said border coordinate data;

means for solving a function with the constants of said approximate straight line as variables, which is to obtain said first sum of squares, with respect to said variables, to obtain an equation representing a straight line;

means for specifying the positions of said patterns which are each the intersection of at least two approximate straight lines; and means for utilizing predetermined values between patterns which are spaced predetermined distances from one another and said patterns which positions have been specified, to obtain an amount of positional deviation of said recording sheet.

5. An apparatus as claimed in claim 4, wherein said video image pickup means are plurally provided, and the positional relationships of which can be detected with high accuracy.

6. An apparatus as claimed in claim 4, wherein said video image pickup means comprises a mechanism for controlling irradiation and reflection of an illuminating light beam and a photo-electric conversion element.

7. A method for measuring an amount of positional deviation of a recording sheet, comprising the steps of:

selecting an illuminating light beam suitable for the color of a predetermined pattern on a recording sheet;

forming a video image of a recording sheet on which a plurality of patterns are printed;

converting said vide image into binary signal data which are stored in an image memory;

producing border coordinate data representing the coordinates of a border where said image data changes greatly in signal level;

setting data of an approximate straight line which approximates a line connecting the borders of said patterns;

obtaining a first sum of squares of the differences between said approximate straight line and said border coordinate data;

solving a function with the constants of said approximate straight line as variables, which is to obtain said first sum of squares, with respect to said variables, to obtain an equation for a straight line;

calculating a typical position of said pattern which is the intersection of at least two approximate straight lines;

establishing a curvilinear function for a curve connecting the typical positions of said plurality of patterns;

obtaining a second sum of squares of the differences between said curvilinear function and the typical positions of said plurality of patterns; and solving an equation with the constants of said curvilinear function as variables to obtain second sum of squares with respect to said variables, to obtain an equation for a curvilinear function.

8. An method for measuring an amount of positional deviation of a recording sheet, comprising the steps of:

selecting an illuminating light beam suitable for the color of a predetermined pattern on a recording sheet;

forming a video image of a recording sheet on which a plurality of patterns made up of at least two different colors are printed;

converting said vide image into binary signal data which are stored in an image memory;

producing border coordinate data representing the coordinates of a border where said image data changes greatly in signal level;

setting data of an approximate straight line which approximates a line connecting the borders of said patterns;

obtaining a first sum of squares of the differences between said approximate straight line and said border coordinate data;

solving a function with the constants of said approximate straight line as variables, which is to obtain said first sum of squares, with respect to said variables, to obtain an equation representing a straight line;

specifying the positions of said patterns which are each the intersection of at least two approximate straight lines; and utilizing predetermined values between patterns which are spaced predetermined distances from one another and said patterns which positions have been specified, to obtain an amount of positional deviation of said recording sheet.

* * * * *

UNITED STATES PATENT AND TRADEMARK OFFICE
CERTIFICATE OF CORRECTION

PATENT NO. : 5,146,099

DATED : September 8, 1992

INVENTOR(S) : Miyoshi et al.

It is certified that error appears in the above-identified patent and that said Letters Patent is hereby corrected as shown below:

Claim 1, column 12, line 49, change "vide" to --video--.

Claim 4, column 13, line 30, change "vide" to --video--.

Claim 7, column 14, line 6, change "vide" to --video--.

Claim 8, column 14, line 42, change "vide" to --video--.

Signed and Sealed this

Twenty-eighth Day of September, 1993

Attest:

BRUCE LEHMAN

Attesting Officer  Commissioner of Patents and Trademarks